US011010665B2

(12) United States Patent
Karlinsky et al.

(10) Patent No.: US 11,010,665 B2
(45) Date of Patent: May 18, 2021

(54) METHOD OF DEEP LEARNING-BASED EXAMINATION OF A SEMICONDUCTOR SPECIMEN AND SYSTEM THEREOF

(71) Applicant: Applied Materials Israel Ltd., Rehovot (IL)

(72) Inventors: Leonid Karlinsky, Rehovot (IL); Boaz Cohen, Lehavim (IL); Idan Kaizerman, Meitar (IL); Efrat Rosenman, Aseret (IL); Amit Batikoff, Petach Tikva (IL); Daniel Ravid, Herzeliya (IL); Moshe Rosenweig, Rehovot (IL)

(73) Assignee: Applied Material Israel, Ltd., Rehovot (IL)

( * ) Notice: Subject to any disclaimer, the term of this patent is extended or adjusted under 35 U.S.C. 154(b) by 837 days.

(21) Appl. No.: 15/668,623

(22) Filed: Aug. 3, 2017

(65) Prior Publication Data
US 2017/0357895 A1    Dec. 14, 2017

Related U.S. Application Data

(63) Continuation of application No. 15/384,058, filed on Dec. 19, 2016.
(Continued)

(51) Int. Cl.
*G06N 3/08*  (2006.01)
*G06N 3/04*  (2006.01)
(Continued)

(52) U.S. Cl.
CPC ............... *G06N 3/08* (2013.01); *G06K 9/036* (2013.01); *G06K 9/4628* (2013.01); *G06K 9/6271* (2013.01); *G06N 3/0454* (2013.01)

(58) Field of Classification Search
None
See application file for complete search history.

(56) References Cited

U.S. PATENT DOCUMENTS 5,729,466 A    3/1998  Bamji
5,835,633 A    11/1998 Fujisaki
(Continued)

FOREIGN PATENT DOCUMENTS

CN    104412302 A    3/2015
CN    104903712 A    9/2015
(Continued)

OTHER PUBLICATIONS

Pal et al. (A Review on Image Segmentation Techniques, Mar. 1993, pp. 1277-1294) (Year: 1993).*
(Continued)

*Primary Examiner* — George Giroux
(74) *Attorney, Agent, or Firm* — Lowenstein Sandler LLP

(57) ABSTRACT

There are provided system and method of segmentation a fabrication process (FP) image obtained in a fabrication of a semiconductor specimen. The method comprises: upon obtaining a Deep Neural Network (DNN) trained to provide segmentation-related data, processing a fabrication process (FP) sample using the obtained trained DNN and, resulting from the processing, obtaining by the computer segments-related data characterizing the FP image to be segmented, the obtained segments-related data usable for automated examination of the semiconductor specimen. The DNN is trained using a segmentation training set comprising a plurality of first training samples and ground truth data associated therewith, each first training sample comprises a training image; FP sample comprises the FP image to be segmented.

18 Claims, 10 Drawing Sheets

Related U.S. Application Data

(60) Provisional application No. 62/271,219, filed on Dec. 22, 2015.

(51) Int. Cl.
*G06K 9/62* (2006.01)
*G06K 9/46* (2006.01)
*G06K 9/03* (2006.01)

(56) References Cited

U.S. PATENT DOCUMENTS

| | | | |
|---|---|---|---|
| 6,456,899 B1* | 9/2002 | Gleason | G03F 7/7065 |
| | | | 700/110 |
| 7,062,397 B1 | 6/2006 | Minor | |
| 2003/0223639 A1* | 12/2003 | Shlain | G06K 9/4647 |
| | | | 382/190 |
| 2004/0078108 A1* | 4/2004 | Choo | G01N 21/4738 |
| | | | 700/121 |
| 2013/0289952 A1 | 10/2013 | Marwah | |
| 2013/0325774 A1 | 12/2013 | Sinyayskiy | |
| 2014/0212024 A1* | 7/2014 | Chen | G01N 23/2251 |
| | | | 382/149 |
| 2014/0307963 A1 | 10/2014 | Zimmer | |
| 2015/0213596 A1 | 7/2015 | Tandi | |
| 2015/0262038 A1* | 9/2015 | Konuru | G06K 9/6254 |
| | | | 382/149 |
| 2016/0140425 A1 | 5/2016 | Kulkarni et al. | |
| 2016/0163035 A1 | 6/2016 | Chang et al. | |
| 2017/0083751 A1* | 3/2017 | Tuzel | G06K 9/00302 |

FOREIGN PATENT DOCUMENTS

| | | |
|---|---|---|
| KR | 101688458 B1 | 12/2016 |
| TW | 201507045 A | 2/2015 |
| TW | 201525450 A | 7/2015 |
| WO | WO16075293 A1 | 5/2016 |

OTHER PUBLICATIONS

Telidevara (Silicon Wafer Defect Segmentation Using Modified Pulse Coupled Neural Network, May 2011, pp. 1-63) (Year: 2011).*

* cited by examiner

METHOD OF DEEP LEARNING-BASED EXAMINATION OF A SEMICONDUCTOR SPECIMEN AND SYSTEM THEREOF

CROSS-REFERENCES TO RELATED APPLICATIONS

The present application is continuation of U.S. aplication Ser. No. 15/384,058 filed on Dec. 19, 2016 and claiming benefit from U.S. Application No. 62/271,219 filed on Dec. 22, 2015, both applications incorporated hereby by reference in their entirety.

TECHNICAL FIELD

The presently disclosed subject matter relates, in general, to the field of examination of a specimen, and more specifically, to methods and systems for automating of a specimen's examination.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including frequent and detailed inspections of the devices while they are still in the form of semiconductor wafers.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled defects. During the first phase, the surface of a specimen is inspected at high-speed and relatively low-resolution. In the first phase, a defect map is produced to show suspected locations on the specimen having high probability of a defect. During the second phase the suspected locations are more thoroughly analyzed with relatively high resolution. In some cases both phases can be implemented by the same inspection tool, and, in some other cases, these two phases are implemented by different inspection tools.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspect of the presently disclosed subject matter, there is provided a method of examination of a semiconductor specimen, the method comprising: upon obtaining by a computer a Deep Neural Network (DNN) trained for a given examination-related application within a semiconductor fabrication process, processing together one or more fabrication process (FP) images using the obtained trained DNN, wherein the DNN is trained using a training set comprising ground truth data specific for the given application; and obtaining by the computer examination-related data specific for the given application and characterizing at least one of the processed one or more FP images.

The examination-related application can be, for example, classifying at least one defect presented by the at least one FP image, segmenting the at least one FP image, detecting defects in the specimen presented by the at least one FP image, registering between at least two FP images, and regression application enabling reconstructing the at least one FP image in correspondence with different examination modality, etc.

In accordance with further aspects of the presently disclosed subject matter, the training set can comprise a plurality of first training samples and a plurality of augmented training samples obtained by augmenting at least part of the first training samples. The training set can further comprise ground truth data associated with the first training samples and augmented ground truth data associated with the augmented training samples. Optionally, a number of augmented training samples can be substantially larger than a number of first training samples. Optionally, at least substantial part of augmented training samples can be obtained by one or more augmenting techniques preferable to the given application.

In accordance with further aspects of the presently disclosed subject matter, each first training sample can comprise at least one image obtained by an examination modality such as optical inspection; multi-perspective optical inspection, low-resolution inspection by electronic microscope, high-resolution inspection by electronic microscope, image generation based on design data, image generation by altering a captured image, etc.

The one or more FP images can constitute a FP sample, wherein each first training sample comprises images obtained from the same modalities as the one or more FP images. Optionally, each first training sample can further comprises at least one image obtained by an examination modality other than one or more examination modalities used for obtaining the one or more FP images.

In accordance with further aspects of the presently disclosed subject matter, the given examination-related application can be related to a certain production layer. In such a case, respective training set comprises ground truth data specific for said certain production layer and the examination-related data is specific for said certain production layer.

In accordance with further aspects of the presently disclosed subject matter, the given examination-related application can be related to a certain virtual layer consisting of one or more production layers with a similar nature. In such a case, respective training set comprises ground truth data specific for said certain virtual layer and the examination-related data is specific for said certain virtual layer.

In accordance with further aspects of the presently disclosed subject matter, examination flow can comprise at least a first examination-related application and a second examination-related application. In such a case, the method further comprises using for the first application a DNN trained using a training set comprising ground truth data specific for the first application and using for the second application a DNN trained using a training set comprising ground truth data specific for the second application.

In accordance with further aspects of the presently disclosed subject matter, the given examination-related application can be classifying at least one defect presented by the at least one FP image. In such a case, the ground truth data can be informative of classes and/or of class distribution of defects presented in the first training samples and augmented ground truth data can be informative of classes and/or of class distribution of defects presented in the augmented training samples. Augmenting at least part of the first training samples can be provided, for example, by geometrical warping, planting a new defect in an image, amplifying a defectiveness of a pre-existing defect in an image, removing a pre-existing defect from an image and disguising a defect in an image.

In accordance with further aspects of the presently disclosed subject matter, the given examination-related application can be segmenting the at least one FP image (e.g. a high-resolution image of the specimen, a low-resolution image of the specimen or a design data-based image of the specimen). In such a case, examination-related data can be informative of per-pixel segmentation-related values of the at least one FP image.

In accordance with further aspects of the presently disclosed subject matter, the given examination-related application can be detecting defects in the specimen. In such a case, the examination-related data can be informative of true defects presented in the at least one FP image.

In accordance with further aspects of the presently disclosed subject matter, the given examination-related application can be registration between at least two FP images. In such a case, training set comprises a plurality of training samples each comprising at least a pair of images registerable one with regard to another, and the examination-related data is informative of registration-related data with regard to said at least two FP images.

In accordance with further aspects of the presently disclosed subject matter, the given examination-related application can be a regression application enabling reconstructing the at least one FP image in correspondence with different examination modality. In such a case, the training set can comprise a plurality of training samples with images obtained by first examination modalities, each said training sample associated with ground truth data comprising one or more corresponding images obtained by one or more another examination modalities.

In accordance with other aspects of the presently disclosed subject matter, there is provided a non-transitory computer readable medium comprising instructions that, when executed by a computer, cause the computer to perform a method of examination of a semiconductor specimen as disclosed above.

In accordance with other aspects of the presently disclosed subject matter, there is provided a system usable for examination of a semiconductor specimen, in accordance with the aspects disclosed above. The system can comprise a processing and memory block (PMB) operatively connected to an input interface and an output interface, wherein: the input interface is configured to receive one or more fabrication process (FP) images; the PMB is configured to obtain a Deep Neural Network (DNN) trained for a given examination-related application within a semiconductor fabrication process and to process together the one or more received FP images using the trained DNN to obtain examination-related data specific for the given application and characterizing at least one of the processed one or more FP images, wherein the DNN is trained using a training set comprising ground truth data specific for the given application; the output interface is configured to output the obtained examination-related data. The output examination-related data can be usable by one or more examination tools involved in the examination of the specimen.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "training", "segmenting", "registering" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, FPEI system and parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
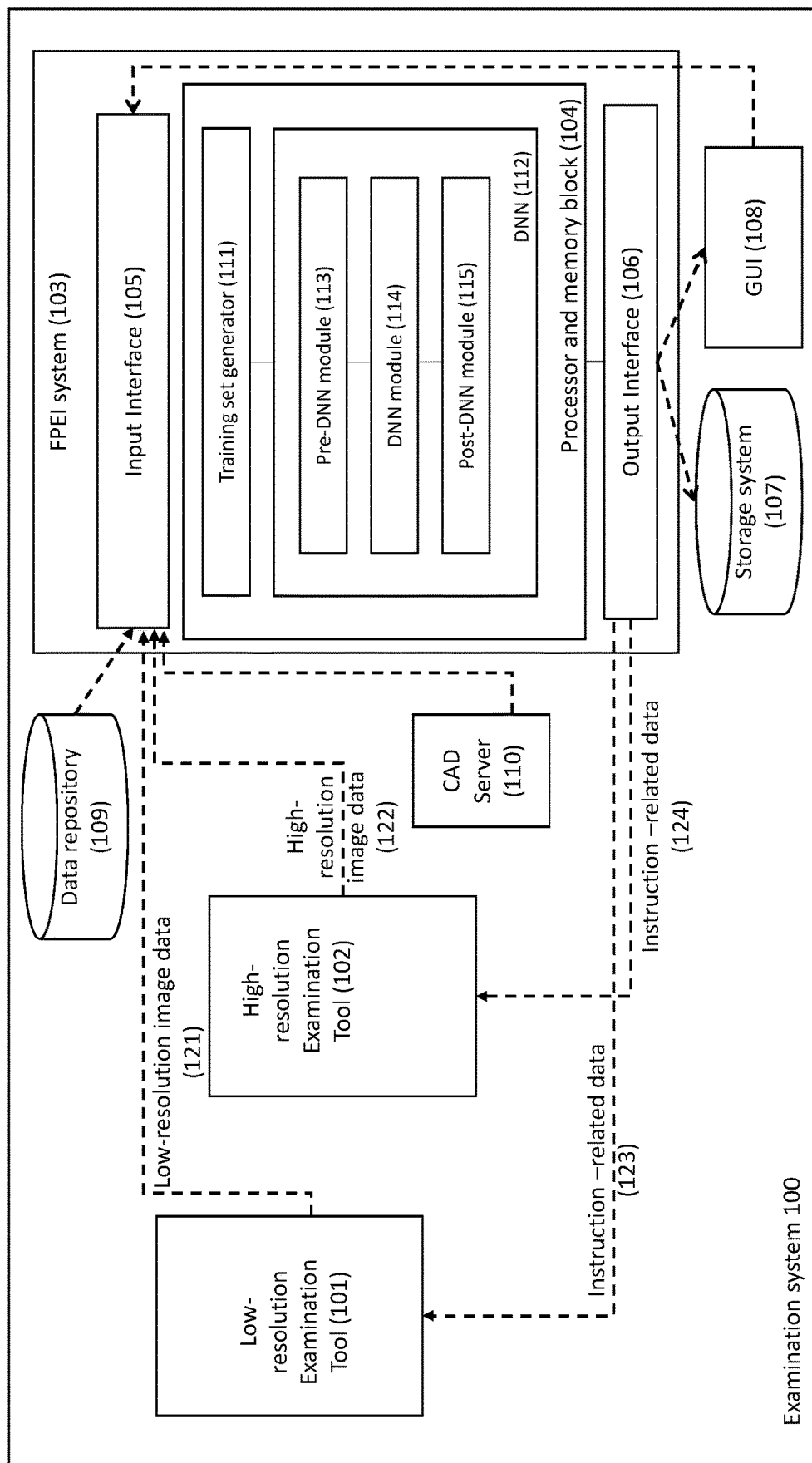
FIG. 1 illustrates a functional block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as a part of specimen fabrication. The illustrated examination system 100 comprises computer-based system 103 capable of automatically determining metrology-related and/or defect-related information using images obtained in specimen fabrication (referred to hereinafter as fabrication process (FP) images). The system 103 is referred to hereinafter as an FPEI (Fabrication Process Examination Information) system. FPEI system 103 can be operatively connected to one or more low-resolution examination tools 101 and/or one or more high-resolution examination tools 102. The examination tools are configured to capture inspection images and/or to review the captured inspection image(s) and/or to enable or provide measurements related to the captured image(s). FPEI system is further operatively connected to CAD server 110 and data repository 109.

FPEI system 103 comprises a processor and memory block (PMB) 104 operatively connected to a hardware-based input interface 105 and to a hardware-based output interface 106. PMB 104 is configured to provide all processing necessary for operating FPEI system further detailed with reference to FIGS. 2-9 and comprises a processor (not shown separately) and a memory (not shown separately). The processor of PMB 104 can be configured to execute several functional modules in accordance with computer-readable instructions implemented on a non-transitory computer-readable memory comprised in PMB. Such functional modules are referred to hereinafter as comprised in the PMB. Functional modules comprised in the processor include operatively connected training set generator 111 and Deep Neural Network (DNN) 112. DNN 112 comprises a DNN module 114 configured to enable data processing using deep neural network(s) for outputting application-specific data (e.g. classification, detection, regression, etc.) based on the input data. Optionally, DNN 112 can comprise pre-DNN module 113 configured to provide preprocessing before forwarding data to DNN module and/or post-DNN module 115 configured to provide post-processing data generated by DNN module. Operation of FPEI system 103, PMB 104 and the functional blocks therein will be further detailed with reference to FIGS. 2-9.

As will be further detailed with reference to FIGS. 2-9, FPEI system is configured to receive, via input interface 105, data (and/or derivatives thereof) produced by the examination tools and/or data stored in one or more data repositories 109 and/or in CAD server 110 and/or another relevant data depository. FPEI system is further configured to process the received data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating FPEI system 103.

By way of non-limiting example, a specimen can be examined by a low-resolution examination machine 101 (e.g. an optical inspection system, low-resolution SEM, etc.). The resulting data (referred to hereinafter as low-resolution image data 121) informative of low-resolution images (and/or derivatives thereof) can be transmitted—directly or via one or more intermediate systems—to FPEI system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122) informative of high-resolution images and/or derivatives thereof can be transmitted—directly or via one or more intermediate systems—to FPEI system 103.

Upon processing the received image data (optionally together with other data as, for example, design data) FPEI system can send the results (e.g. instruction-related data 123 and/or 124) to any of the examination tool(s), store the results (e.g. defect classification) in storage system 107, render the results via GUI 108 and/or send to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in another embodiments at least part of examination tools 101 and/or 102, data repositories 109, storage system 107 and/or GUI 108 can be external to the examination system 100 and operate in data communication with FPEI system 103 via input interface 105 and output interface 106. FPEI system 103 can be implemented as stand-alone computer(s) to be used in conjunction with the examination tools. Alternatively, the respective functions of FPEI system can, at least partly, be integrated with one or more examination tools.

Without limiting the scope of the disclosure in any way, it should also be noted that the examination tools can be implemented as inspection machines of various types, such as optical imaging machines, electron beam inspection machines and so on. In some cases the examination tools can be configured to examine an entire specimen (e.g. an entire wafer or at least an entire die) for detection of potential defects. In other cases, at least one examination tool can be a review tool, which is typically of higher resolution and which is used for ascertaining whether a potential defect is indeed a defect. Such a review tool is usually configured to inspect fragments of a die, one at a time, in higher resolution. In some cases at least one examination tool can have metrology capabilities.

Figure 2:
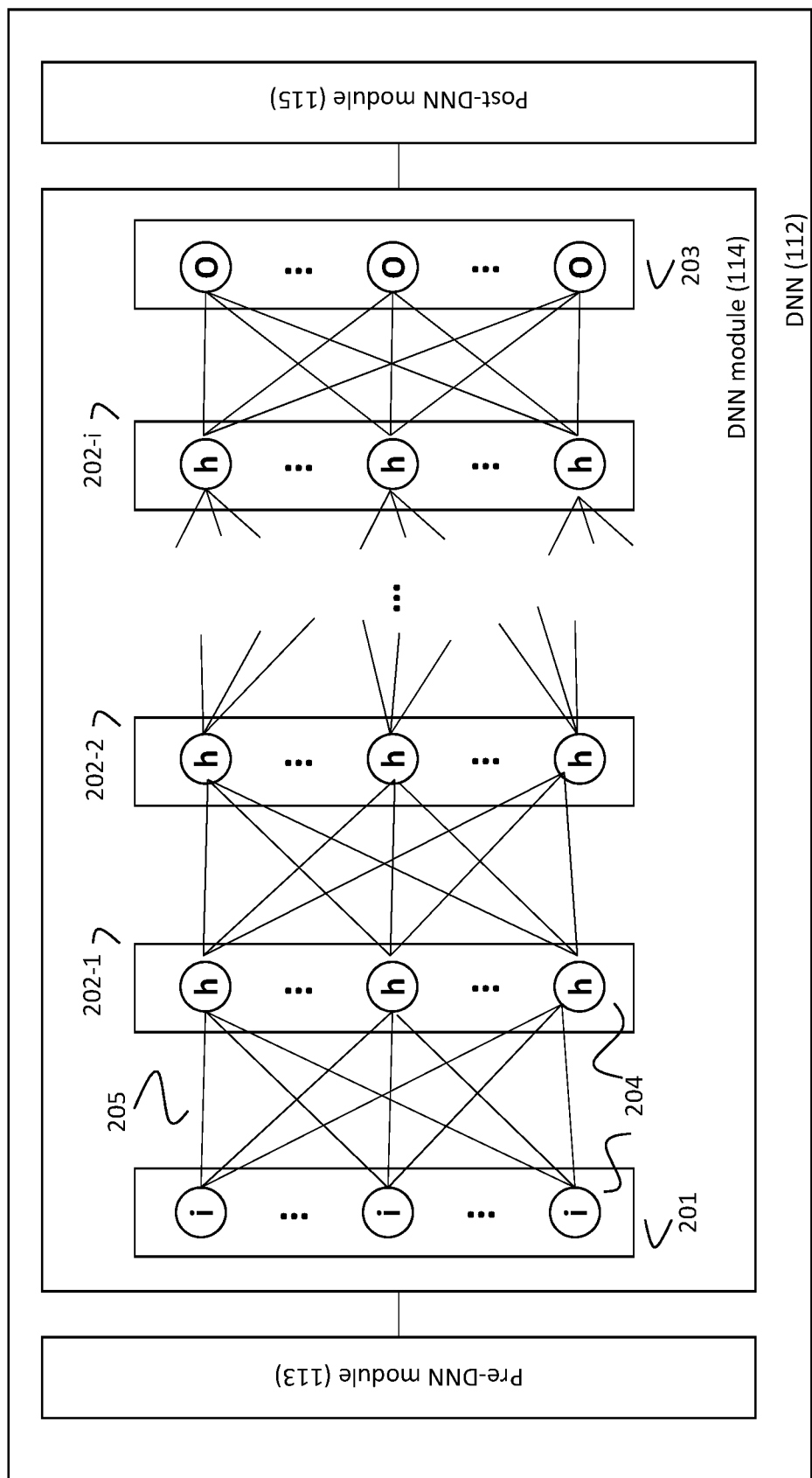
FIG. 2 illustrates a generalized model of an exemplified deep neural network usable in accordance with certain embodiments of the presently disclosed subject matter.

A generalized model of an exemplified deep neural network usable as DNN 112 is illustrated in FIG. 2. The illustrated exemplified DNN comprises DNN module 114 with input layer 201, output layer 203 and one or more hidden layers (denoted as 202-1, 202-2 and 202-i) disposed between the input layer and the output layer. Optionally, DNN comprises pre-DNN module 113 and post-DNN module 114.

Each layer of DNN module 114 can include multiple basic computational elements (CE) 204 typically referred to in the art as dimensions, neurons, or nodes. CEs comprised in the input layer are denoted in FIG. 2 by letter "i", CEs comprised in the hidden layers are denoted by letter "h", and CEs comprised in the output layer are denoted by letter "o". Computational elements of a given layer are connected with CEs of a subsequent layer by connections 205. Each connection 205 between CE of preceding layer and CE of subsequent layer is associated with a weighting value (for simplicity, not shown in FIG. 2).

A given hidden CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given hidden CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function or other suitable function. The output from the given hidden CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in the trained DNN module. After each iteration, a difference can be determined between the actual output produced by DNN module and the target output associated with the respective training set of data. The difference can be referred to as an error value. Training can be determined to be complete when a cost function indicative of the error value is less than a predetermined value or when a limited change in performance between iterations is achieved.

A set of DNN input data used to adjust the weights/thresholds of the deep neural network is referred to hereinafter as a training set.

Inputs to DNN 112 can be pre-processed by pre-DNN module 113 prior to inputting to DNN module 114, and/or outputs of DNN module 114 can be post-processed by post-DNN module 115 before outputting from DNN 112. In such cases training of DNN 112 further includes determining parameters of pre-DNN module and/or post-DNN module. DNN module can be trained so as to minimize cost function of the entire DNN, while parameters of pre-DNN module and/or post-DNN module can be predefined and, optionally, can be adjusted during the training. A set of training-based parameters can further include parameters related to pre-DNN and post-DNN processing.

It is noted that the teachings of the presently disclosed subject matter are not bound by the number of hidden layers and/or by DNN architecture. By way of non-limiting example, the layers in DNN can be convolutional, fully connected, locally connected, pooling/subsampling, recurrent, etc.

Figure 3:
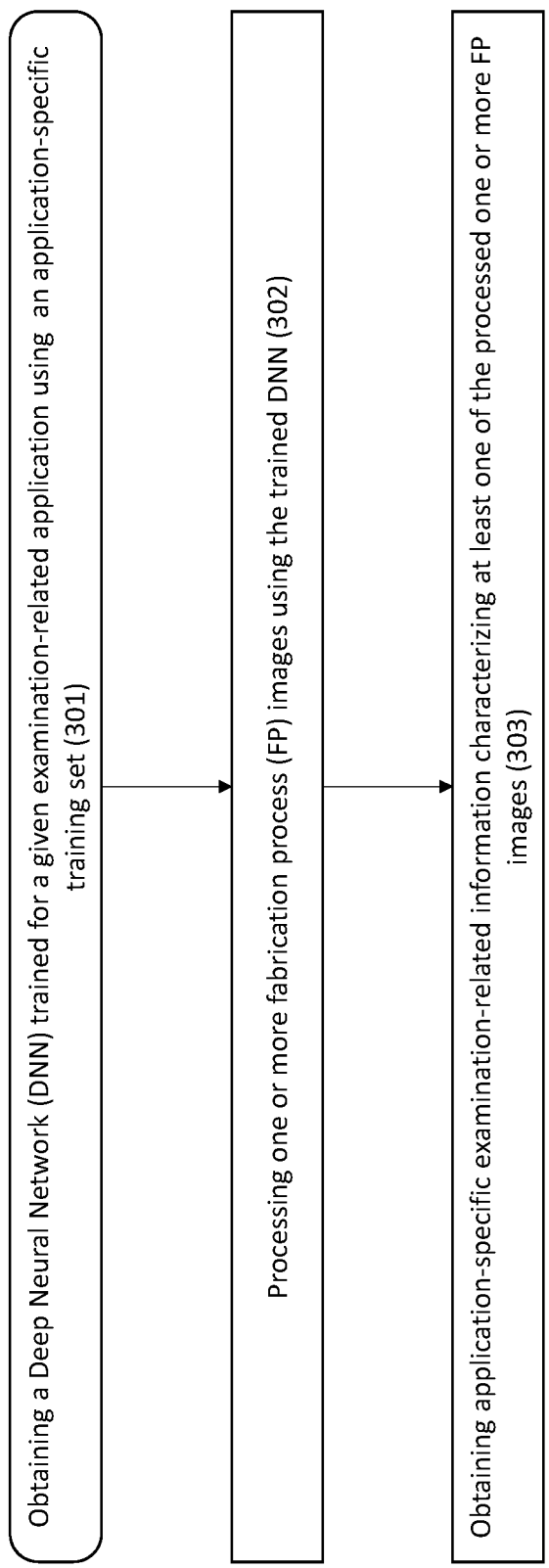
FIG. 3 illustrates a generalized flow-chart of automatically determining examination-related data using fabrication process (FP) images in accordance with certain embodiments of the presently disclosed subject matter.

Referring to FIG. 3, there is illustrated a generalized flow-chart of automatically determining examination-related data using fabrication process (FP) images. In accordance with certain embodiments of the presently disclosed subject matter, the method comprises a setup step comprising training the Deep Neural Network (DNN) 112, wherein DNN is trained for a given examination-related application and is characterized by an application-specific set of training-based parameters. Training DNN 112 in accordance with certain embodiments of the presently disclosed subject matter is further detailed with reference to FIG. 4. By way of non-limiting example, examination-related application can be one of the following:

defect classification using attributes generated by DNN (defining classes can include modifying and/or updating preexisting class definitions);

segmentation of the fabrication process image including partitioning of FP image into segments (e.g. material types, edges, pixel labeling, regions of interest, etc.);

defect detection (e.g. identifying one or more candidate defects (if they exist) using FP image and marking thereof, determining truth value for candidate defects, obtaining shape information for the defects, etc.).

registration between two or more images including obtaining the geometrical warping parameters between the images (can be global or local, simple as shift or more complex transformations);

cross-modality regression (e.g. reconstructing an image from one or more images from a different examination modality as, for example, SEM or optical image from CAD, height map from SEM images, high resolution image from low resolution images);

combination(s) of the above.

Upon obtaining (301) the DNN trained for a given application during the setup step, the PMB of FPEI system, during the runtime, processes (302) together one or more FP images using the obtained trained DNN, and obtains (303) application-specific examination-related data characterizing at least one of the processed one or more FP images. When processing one or more FP images, PMB can also use predefined parameters and/or parameters received from other sources in addition to the training-based parameters characterizing DNN.

FP images to be processed together by the trained DNN can arrive from different examination modalities (e.g. from different examination tools; from different channels of the same examination tool as, for example, bright field and dark field images; from the same examination tool using different operational parameters, can be derived from design data, etc.)

FP images can be selected from images of specimen (e.g. wafer or parts thereof) captured during the fabrication process, derivatives of the capture images obtained by various pre-processing stages (e.g. images of a part of a wafer or a photomask captured by SEM or an optical inspection system, SEM images roughly centered around the defect to be classified by ADC, SEM images of larger regions in which the defect is to be localized by ADR, registered images of different examination modalities corresponding to the same mask location, segmented images, height map images, etc.) and computer-generated design data-based images.

By way of non-limiting example, application-specific examination-related data can represent a per-pixel map of values whose meaning depends on an application (e.g. binary map for defect detection; discrete map for nuisance family prediction indicating the family type or general class; discrete map for defect type classification; continuous values for cross modality or die-to model (D2M) regression, etc.). Per-pixel map can be further obtained together with per-pixel probability map indicative of probability of values obtained for the pixels.

Alternatively or additionally, application-specific examination-related data can represent one or more values summarizing the entire image content (not per-pixel), such as, for example, defect bounding box candidates and associated defectiveness probabilities for automatic defect review application, defect class and class probability for automatic defect classification application, etc.

Alternatively or additionally, obtained application-specific defect-related data can be not directly related to defects, but be usable for defect analyses (e.g. boundaries between layers of the wafer obtained by segmentation of FP images can be usable for defining defects' layers, defect environment data as, for example, characteristics of the background pattern, etc.). Alternatively or additionally, examination-related data can be usable for metrology purposes.

Non-limiting examples of application-specific FP images (DNN input) and application-specific examination-related data (DNN output) are illustrated in Table 1.

TABLE 1

Application-specific FP images and application-specific examination-related data

| Application | Non-limiting example of application-specific FP images | Non-limiting example of application-specific examination-related data |
| --- | --- | --- |
| Classification | Defect images, reference die images, height map, CAD images, defect mask | Defect classification, attributes (e.g. to be used in other classifiers) |

TABLE 1-continued

Application-specific FP images and application-specific examination-related data

| Application | Non-limiting example of application-specific FP images | Non-limiting example of application-specific examination-related data |
| --- | --- | --- |
| Regression | CAD image | Optical or SEM image |
| Regression | SEM images (including perspectives) | Height map |
| Regression | Low resolution images | High resolution image |
| Regression | Noisy images | De-noised image |
| Segmentation | Optical or SEM images, with or without CAD | Segmentation map (label per pixel). |
| Defect detection | Defect image (e.g. optical or SEM, reference image or images (optional), CAD (optional). | Defect bounding box coordinate, defect mask image (all defect pixels are "1", others "0"), etc. |
| Registration | Two images from the same examination modality (e.g. Optical or SEM). | Registration parameters (for a parametric module) |
| Registration | Two images from different examination modalities (SEM-Optical, Optical-CAD, SEM-CAD) | Optical flow map (X and Y displacements for each pixel) |

Non-limiting examples of processing FP images and obtaining application-specific examination-related data are further detailed with reference to FIGS. 5-9.

Figure 4:
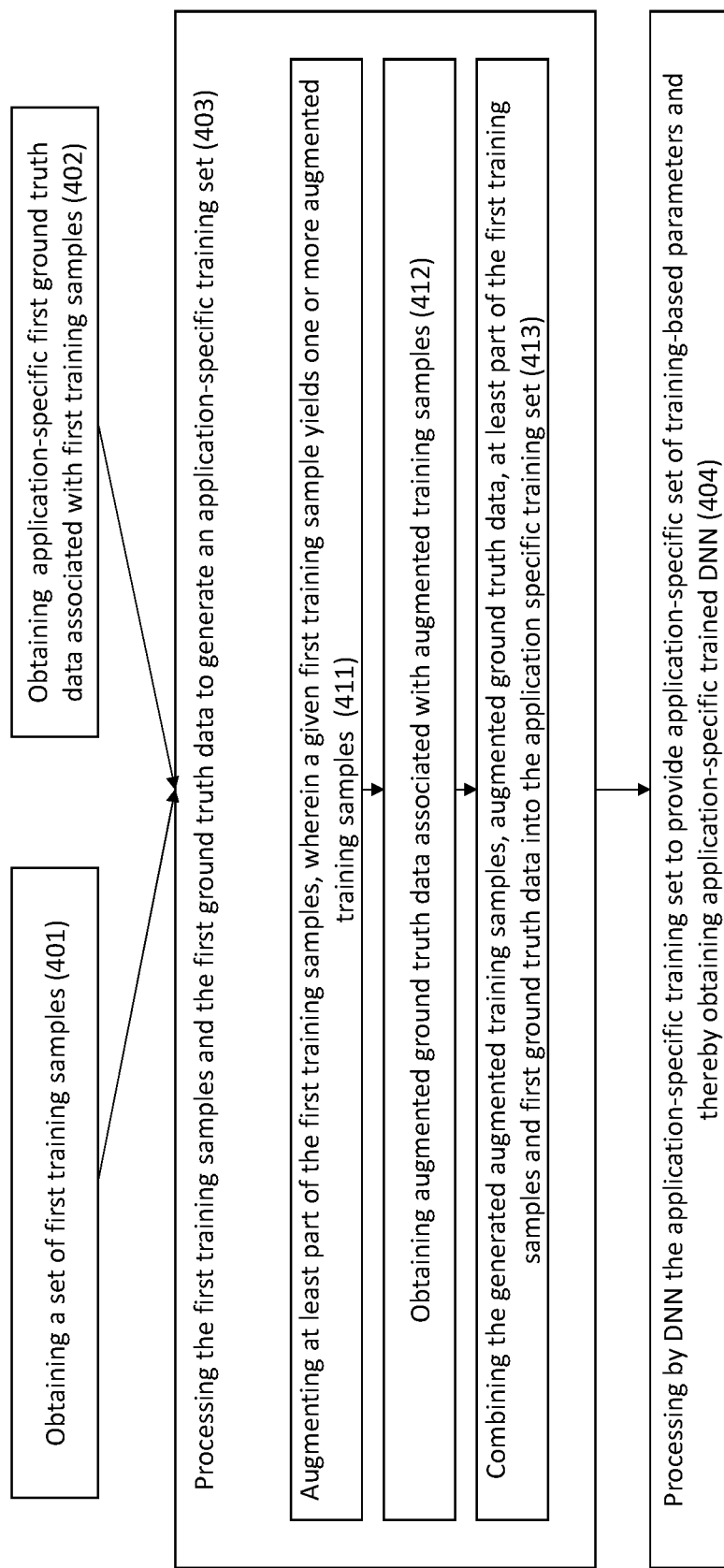
FIG. 4 illustrates a generalized flow-chart of training a deep neural network (DNN) in accordance with certain embodiments of the presently disclosed subject matter.

The technique illustrated with reference to FIGS. 3-4 is applicable for mask examination and/or metrology flow and wafer examination and/or metrology flow (e.g. D2D, SD and CAD-aided, ADR/ADC flows, etc.), for multi-modality and single image flows such as CAD-2-SEM registration, for multi-perspective detection (ADR), for multi-perspective classification (ADC), etc.

It is noted that a given examination-related application can be further characterized by a certain production layer to be examined or a group thereof. By way of non-limiting example, defect detection and/or classification for a "virtual layer" constituted by one or more metal layers can use attributes generated by DNN specially trained for this virtual layer. Likewise, another specially trained DNN can be used for defect detection and/or classification in a "virtual layer" constituted by one or more mask layers.

Referring to FIG. 4, there is illustrated a generalized flow-chart of training DNN 112 in accordance with certain embodiments of the presently disclosed subject matter. When used in conjunction with obtaining application-specific information, DNN 112 is trained for a given examination-related application and is characterized by application-specific training-based parameters.

When training DNN 112, FPEI system obtains (401) a set of first training samples, obtains (402) first ground truth data corresponding to the first training samples and processes the first training samples and first ground truth data to generate (e.g. by the training set generator) (403) an application-specific training set.

The set of first training samples and ground truth data can be obtained via input interface 105 from data repository 109, CAD server 110 or any other suitable data repository. Alternatively or additionally, ground truth data can be obtained via GUI 108.

Depending on application, a training sample can be a single image or a group of images of specimen obtained by the same or by different examination modalities. It is noted that examination modalities can differ one from another by sources of respective images (e.g. images captured by a scanning electron microscope (SEM), by images captured by an optical inspection system, images derived from the captured images, CAD-based generated images, etc.) and/or by deriving techniques applied to the captured images (e.g. images derived by segmentation, defect contour extraction, height map calculation, etc.) and/or by examination parameters (e.g. by perspective and/or resolution provided by a certain examination tool, etc.). It is further noted that all first training samples used for a given training process shall be constituted by the same number of images obtained by the same examination modalities and having the same relationship within the training sample (e.g. single image from a certain modality, or a pair constituted by an image and a reference image, or a group constituted by a top perspective image, 4 side perspective images and a CAD-based image, etc.)

Values of ground truth data include images and/or labels associated with application-specific training samples. Ground truth data can be synthetically produced (e.g. CAD-based images), actually produced (e.g. captured images), produced by machine-learning annotation (e.g. labels based on feature extracting and analysis); produced by human annotation, a combination of the above, etc.

It is noted that, depending on application, the same image can be used for a training sample or for ground truth data. By way of non-limiting example, a CAD-based image can be used as a training sample for segmentation applications and as ground truth data for regression applications. In accordance with certain embodiments of the currently presented subject matter, ground truth data can vary by application. Non-limiting examples of application-specific ground truth data are illustrated in Table 2.

TABLE 2

Application-specific examples of ground truth data

| Application | Non-limiting example of ground truth data |
|---|---|
| Classification | True class of each example |
| Regression | The actual image that should be reconstructed |
| Segmentation | Segmented images (pixel values are the indices of the segments) |
| Defect detection | Bounding box or mask, if defects exist |
| Registration | Registration parameters (for parametric modules) or actual shift at each pixel for optical flow |

Generating (403) training set of images can include augmenting (411) at least part of the first training samples and including the augmented training samples in the generated training set, wherein a given first training sample can yield one or more augmented training samples. An augmented training sample is derived from a first training sample by augmenting one or more images in the first training sample. Augmentation of an image from a first training sample can be provided by various image processing techniques including adding noise, blurring, geometric transformation (e.g. rotating, stretching, simulating different angles, cropping, scaling, etc.) tone mapping, changing vector information of one or more pixels of the image (e.g. adding and/or modifying perspectives or channels of acquisition, etc.), etc. Alternatively or additionally, an image from the first training sample can be augmented using synthetic data (e.g. defect-related data, simulated connectors or other objects, implants from other images, etc.). By way of non-limited example, available images (and/or parameters) of known defect types can be used to plant a new defect in an image, amplify a defectiveness of a pre-existing defect in the image, remove a defect from the image, disguise a defect in the image (making it harder to spot), etc. Yet alternatively or additionally, a captured image from a first training sample can be augmented using segmentation, defect contour extraction and/or height map calculation, and/or can be obtained by processing together with corresponding CAD-based image.

Augmentation techniques can be applied to the image(s) of the first training sample in an application-independent manner. Alternatively, augmented training samples can be derived in an application-specific manner, wherein at least a substantial part of respective augmented images is obtained by technique(s) preferable to a specific application. Non-limiting examples of application-specific preferable augmentation techniques are illustrated in Table 3.

TABLE 3

Application-specific examples of preferable augmentation techniques

| Application | Non-limiting example of preferable augmentation techniques |
|---|---|
| Classification | Geometric transformation, tone mapping, implanting synthetic defects, modification of defect tones |
| Regression | Adding noise, blurring, tone mapping |
| Segmentation | Adding noise, blurring, tone mapping, synthetic images |
| Defect detection | Adding noise, blurring, tone mapping, implanting synthetic defects, modification of defect tones |
| Registration | Geometric transformation, tone mapping |

As a first training sample can yield several augmented training samples, the number of training samples in the training set can be substantially larger than a number of first samples. For example, the set of first training samples can include between 100 and 50,000 training samples, while the generated training set can include at least 100,000 training samples. It is noted that capturing images is a slow—and possibly also costly—process. Generating a sufficient amount of training samples in the training set by augmenting the captured images in the first training samples enables reduction of time and/or cost.

Generating (403) training set of images further includes obtaining (412) augmented ground truth data with regard to the augmented training samples and associating (413) the augmented training samples and the augmented ground truth data. The generated training set can be stored in the memory of PMB 104 and can comprise application-specific first training samples associated with application-specific ground truth data and, optionally, augmented training samples associated with augmented ground truth data.

Likewise for first ground truth data, augmented ground truth data can be provided by a person analyzing the images, with or without the aid of a computer system. Alternatively or additionally, augmented ground truth data can be generated by FPEI system by processing the first ground truth data in correspondence with provided augmentation of the images in respective first training samples when deriving the augmented training samples.

It is noted that augmenting the first training samples and including the augmented training samples and augmented ground truth data into the training set is optional. In certain embodiments of the invention the training set can include only first training samples associated with respective ground truth data.

It is further noted that the training samples can include images obtained from examination modalities that are not available during runtime, such images being used for tuning DNN's training-related parameters. By way of non-limiting example, a training sample for defect detection or classification applications can, in addition to low-resolution image corresponding to low-resolution FP images to be used during runtime, include corresponding high-resolution SEM images available only at setup step. Likewise, a training sample for segmentation or registration application can include, in addition, CAD-based images available only at setup step.

Upon obtaining the application-specific training set, FPEI system uses DNN 112 to iteratively process the training set and to provide (404) application-specific set of training-based parameters and thereby to obtain application-specific trained DNN. Obtained training-based parameters correspond to application-specific cost functions. Non-limiting examples of application-specific cost functions are illustrated in Table 4. Optionally, processing the training set using DNN can include pre-process operations by pre-DNN module 113 (e.g. selecting input channels, resizing/cropping, etc.) and post-process operations by post-DNN module 115 (e.g. executing spatial pyramid pooling, multi-scale pooling, Fisher Vectors, etc.). In addition to application-specific optimized weights, training-based parameters can include optimized application-specific thresholds, application-specific pre-processing parameters and application-specific post-processing parameters.

TABLE 4

Application-specific examples of cost functions usable for training

| Application | Non-limiting example of cost functions usable for training |
|---|---|
| Classification | Classification error (most commonly used is "softmax regression") |
| Regression | Maximal absolute error, MSE, error at a given percentile |
| Segmentation | Segmentation accuracy (measure of correct pixels vs. wrong) |
| Defect detection | Detection accuracy + penalty for misdetection and over-detections |
| Registration | Maximal error (across all pixels), relative deviation from model parameters |

Thus, in accordance with certain embodiments of the presently disclosed subject matter, DNN training process bridges between application-specific training samples and respective ground truth data, thereby enabling further processing of FP images with no need for, being typically unfeasible, acquiring ground truth data during runtime.

It is noted that the illustrated training process can be cyclic, and can be repeated several times until the DNN is sufficiently trained. The process can start from an initially generated training set, while a user provides a feedback for the results reached by the DNN based on the initial training set. The provided feedback can include, for example:
- manual re-classification of one or more pixels, regions and/or defects;
- prioritization of classes;
- changes of sensitivity, updates of ground-truth segmentation and/or manually defining regions of interest (ROIs) for segmentation applications;
- re-defining mask/bounding box for defect detection applications;
- re-selecting failed cases and/or manually registering failures for registration applications;
- re-selecting features of interest for regression applications, etc.

PMB can adjust the next training cycle based on the received feedback. Adjusting can include at least one of: updating the training set (e.g. updating ground truth data and/or augmentation algorithms, obtaining additional first training samples and/or augmented training samples, etc.), updating cost function, updating pre-DNN and/or post/DNN algorithms, etc. Optionally, some of the training cycles can be provided not to the entire DNN 112, but rather to pre-DNN module 113, post-DNN module 115 or to one or more higher layers of DNN module 114.

FIG. 4 illustrates training a deep neural network directly on data related to fabricated specimens. It is noted that the teachings of the presently disclosed subject matter are, likewise, applicable to DNNs coarsely trained on a different data set, possibly irrelevant to the fabricated specimens, and further finely trained for specific examination-related application (e.g. with the help of transfer learning technique). Likewise, DNN can be coarsely trained (pre-trained) using other techniques known in the art.

Figure 5A:
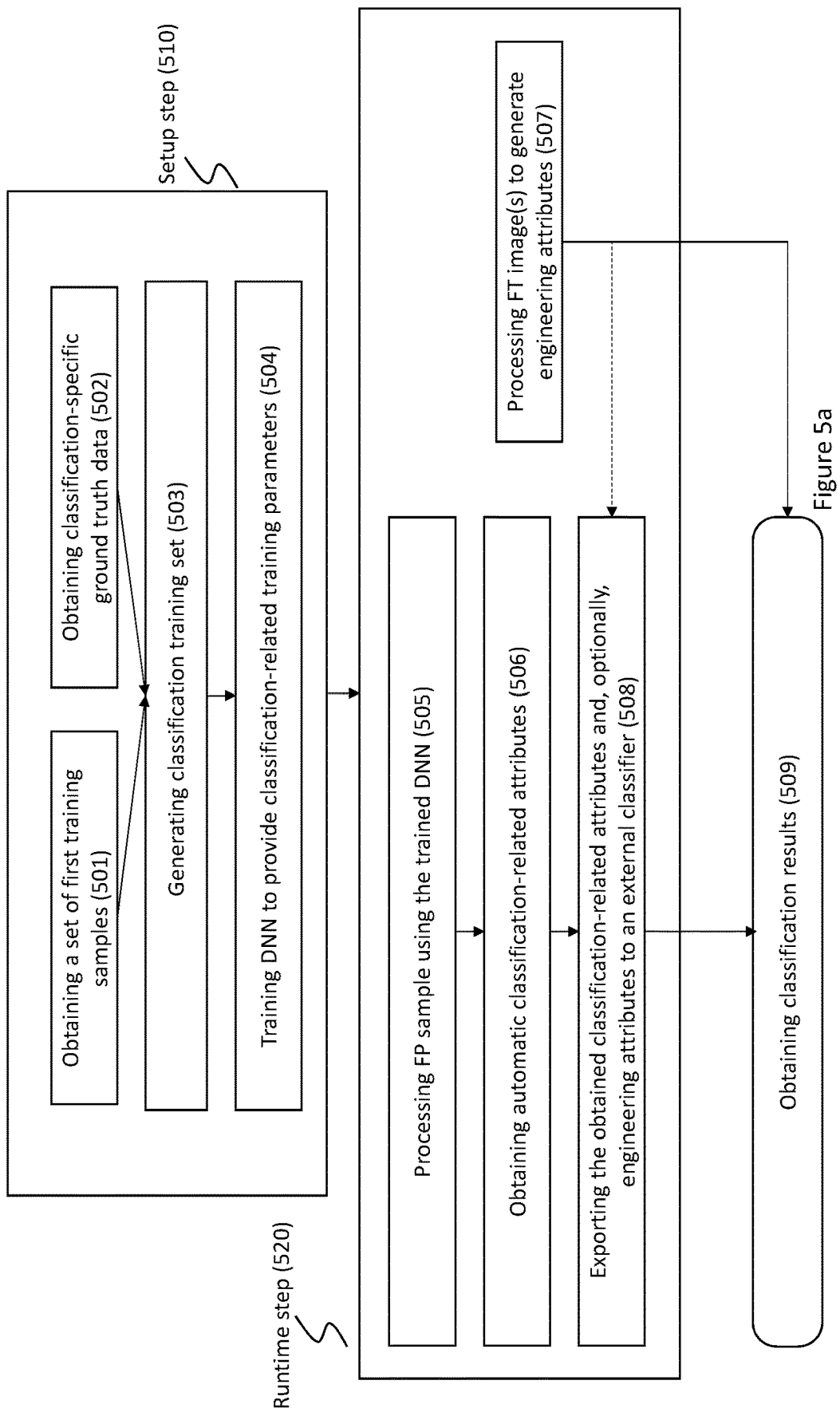
FIG. 5a and FIG. 5b illustrate generalized flow-charts of classifying defects in accordance with certain embodiments of the presently disclosed subject matter.
Figure 5B:
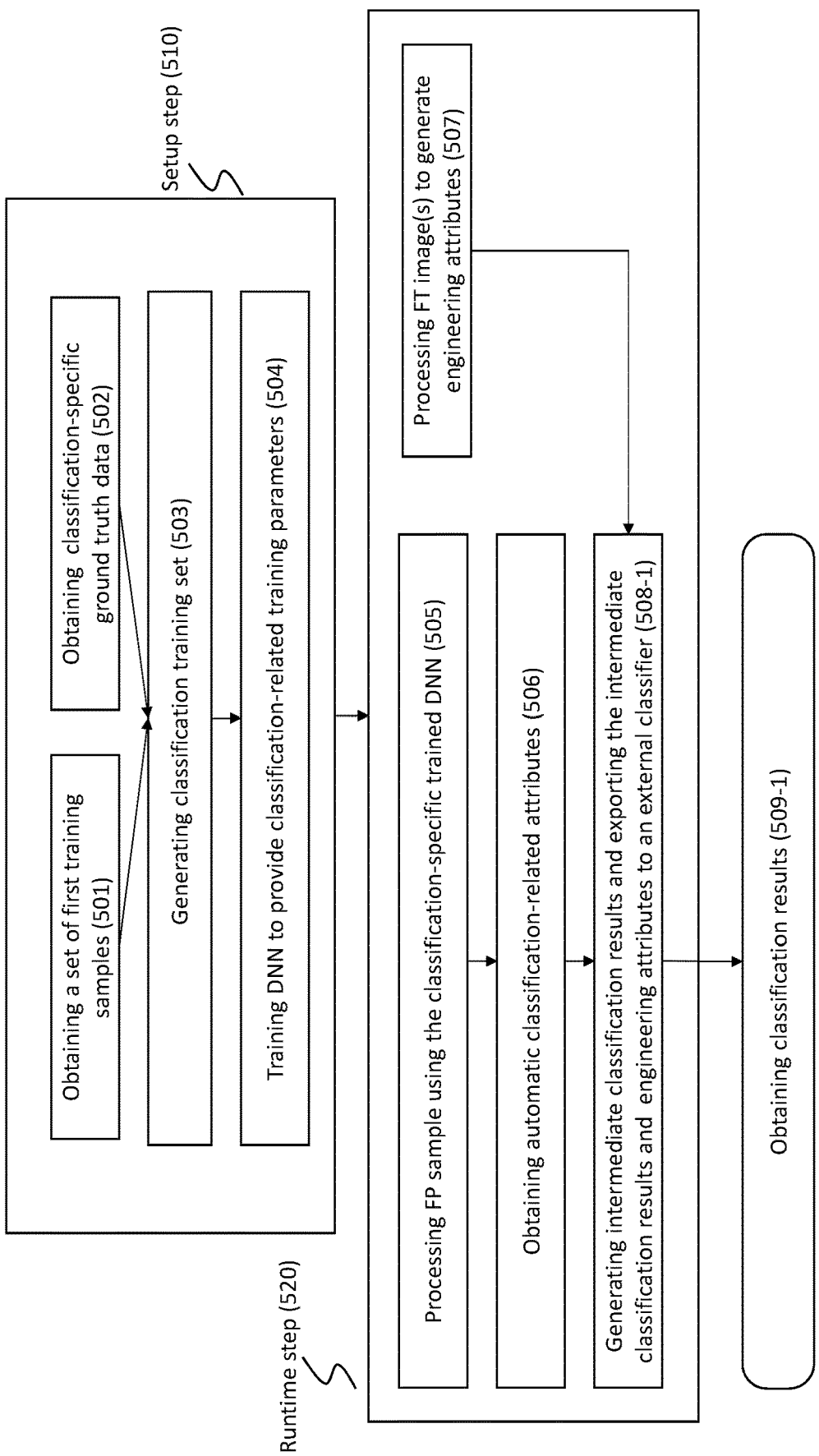

Non-limiting examples of implementing the detailed above technique of obtaining examination-related data using the application-specific trained DNN network are further detailed with reference to FIGS. 5-9. The processes illustrated with reference to FIGS. 5-9 comprise a setup step of application-specific training of DNN, and runtime step of using the trained DNN for specific application. PMB further uses the trained DNN to processes together one or more FP images and, to obtain, thereby, application-specific examination-related data. The one or more FP images constitute a fabrication process sample (FP sample). Depending on application, a FP sample can be a single image or a group of images obtained by the same or by different examination modalities. It is noted that training samples shall correspond to FP samples to be used for respective application. For a given application, each first training sample shall comprise at least the same number of images obtained by the same examination modalities and being in the same relationship as the images in a respective FP sample. Optionally, training samples can further comprise additional images obtained by additional examination modalities being, typically, unavailable during runtime. Referring to FIGS. 5a and 5b, there are illustrated non-limiting examples of implementing the detailed above technique of obtaining examination-related data for classifying defects in a specimen. The illustrated method of operating the FPEI system can be usable, for example, for automatic defect classification (ADC).

The process comprises a setup step 510 of classification-specific training of DNN, and runtime step 520 of using the trained DNN for defect classification.

During the setup 510 (common for FIGS. 5a and 5b), upon obtaining the set of first training samples (501) and respective ground truth data (502), PMB 104 generates (503) a classification training set and uses the generated classification training set to obtain (504) the trained DNN characterized by classification-related training parameters. Generating the classification training set can include augmenting the first training samples and the ground truth data and including the augmented training samples and augmented ground truth data into the training set.

Each of the first training samples can comprise a single previously-captured high resolution image of a defect. Optionally, at least part of such single images can be images of known defect types; such images can be available from one or more $3^{rd}$ party databases. Optionally, a single image in a first training sample can be an "intermediate" image previously derived from a defect image (e.g. by segmentation, defect contour extraction, height map calculation, etc.)

and stored in a data repository (e.g. data repository 109). Optionally, each of the first training samples can further comprise images from additional modalities as, for example, reference die images, CAD-based images, height map, defect mask, images obtained from different perspectives, etc.

An augmented training sample can be obtained by augmenting a first training sample (e.g. by geometrical warping, planting a new defect in an image, amplifying a defectiveness of a pre-existing defect in the image, removing a defect from the image, disguising a defect in the image, etc.)

The obtained ground truth data associated with the first training samples is informative of classes (e.g. particles, pattern deformation, bridges, etc.) and/or of class distribution (e.g. probability of belonging to each of the classes) of defects presented in the first training samples. Likewise, the augmented ground truth data is informative of classes/class distribution of defects in the augmented training samples.

Thus, the generated classification training set can include training samples with high-resolution captured defect images, associated ground truth data informative of classes and/or class distribution of defects in the captured images and, optionally, the augmented training samples and augmented ground truth data informative of classes and/or class distribution of defects in the augmented training samples.

Upon generating (503) the classification training set, PMB trains (504) the DNN to extract classification-related features and to provide classification-related attributes enabling minimal classification error. The training process yields the trained DNN with classification-related training parameters.

During runtime 520, PMB uses the classification-specific trained DNN to process (505) a FP sample comprising a captured high-resolution FP defect image and to obtain (506) automatic classification-related attributes. Optionally, an FP sample can further comprise, in correspondence with training samples, reference die images, CAD-based images, height map, defect mask, etc., these FP images to be processed by DNN together with the high resolution FP defect image. PMB can further obtain (507) engineered attributes (e.g. defect size, orientation, background segment, etc.) related to the defect to be classified. Engineered attributed can be generated by PMB in accordance with pre-defined instructions stored in PMB.

In the process illustrated in FIG. 5a, FPEI system exports (508) the classification-related attributes obtained by DNN and, optionally, the engineered attributes to an external classifier, and further exports the engineered attributes to an external classification system. Obtaining classification results (509) includes processing by an external classification system the results it receives from the external classifier (which can be, optionally, a part of the external classification system) together with engineered attributes.

In the process illustrated in FIG. 5b, FPEI system uses the classification-related attributes obtained by DNN and, optionally, the engineered attributes (optionally obtained when processing FP image(s)) to generate (508-1) intermediate classification results. FPEI system further exports (508-1) the intermediate classification results and the engineered attributes to an external classification system. The external classification system processes (509-1) the received data and yields the classified defect(s). Optionally, operation 508-1 can be omitted, and FPEI can use classification-related attributes obtained by DNN and the engineered attributes to yield the classified defects with no involvement of the external classification system.

Thus, as illustrated, the classification application can be implemented in different ways. By way of non-limiting example, the classification-specific trained DNN can classify a defect presented in FP image based either on a combination of DNN classification-related attributes and engineered attributes it obtains or base, merely, on the DNN obtained classification-related attributes. Alternatively, classification-specific trained DNN can enable classification of such defect by providing classification-related attributes (and, optionally, engineered attributes) to an external classification system.

Figure 6:
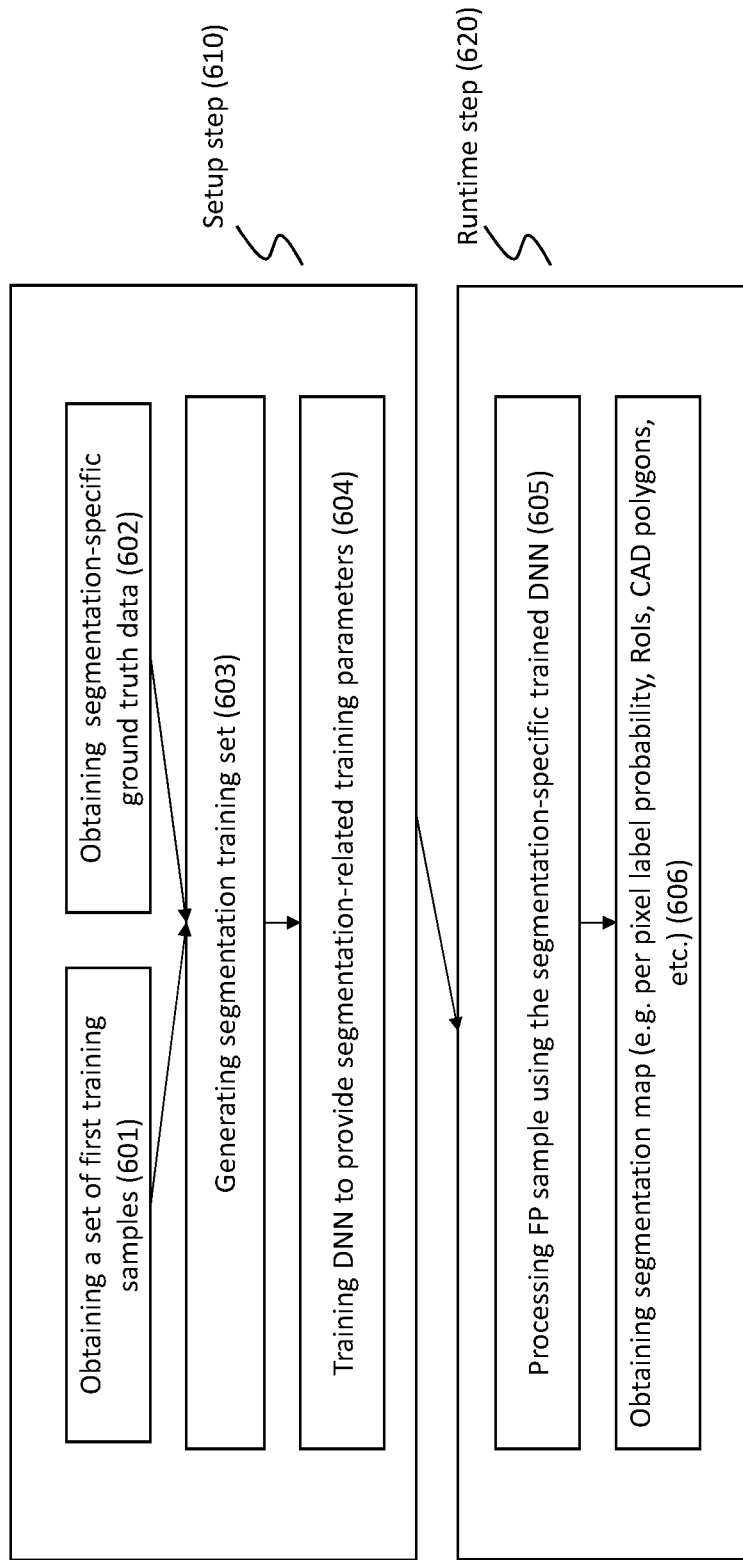
FIG. 6 illustrates a generalized flow-chart of segmentation of examination-related images in accordance with certain embodiments of the presently disclosed subject matter.

Referring to FIG. 6, there is illustrated a non-limiting example of implementing the technique detailed with reference to FIGS. 1-4 for segmentation of an FP image. Unless specifically stated otherwise, the term "segmentation" used in this specification should be expansively construed to cover any process of partitioning the image into meaningful parts (for example, background and foreground or defect and non-defect, etc.) whilst providing per-pixel values. By way of non-limiting example, it can be usable for ADC when constructing attributes (e.g. for defining if the defect is on the main pattern, on the background, or both), for ADR for applying segment-specific detection thresholds on each segment, etc.

The process comprises a setup step 610 of segmentation-specific training of DNN and runtime step 620 of using the trained DNN for image segmentation.

During the setup 610, upon obtaining the set of first training samples (601) and ground truth data (602), PMB 104 generates (603) segmentation training set and uses the generated segmentation training set to obtain (604) the trained DNN characterized by segmentation-related training parameters. Optionally, generating segmentation training set can include augmenting the first training samples and obtaining augmented ground truth data associated therewith.

The first training samples can include previously-captured low-resolution images and/or high-resolution images and, optionally, CAD-based images.

Optionally, the training set can further comprise augmented training samples (e.g. by adding noise, blurring, tone mapping, etc.). The obtained ground truth data is informative of segments-related data associated with respective training samples. By way of non-limiting example, the segments-related data associated with a given training sample can be informative of per-pixel segmentation; per-pixel labels; CAD polygons; CAD models; ROIs, etc. Likewise, the augmented ground truth data is informative of segments-related information with regard to respective augmented training samples.

Upon generating (603) the segmentation training set, PMB trains (604) the DNN to provide required pixel values (e.g. a grayscale image in which different color value for each pixels represent different segments on the image; representation of segments as, for example, edges or vertices of each segment, etc.) with minimal error. The training process yields the trained DNN with segmentation-related training parameters.

During runtime 620, PMB uses the trained DNN to process (605) a FP sample comprising a captured FP image to be segmented (and, optionally, additional FP images in correspondence with training samples) in order to provide (606) the segmentation thereof. The obtained segments-related data can be informative of per-pixel segmentation, per-pixel labels, CAD polygons, CAD models, ROIs in the FP image, etc.

Figure 7:
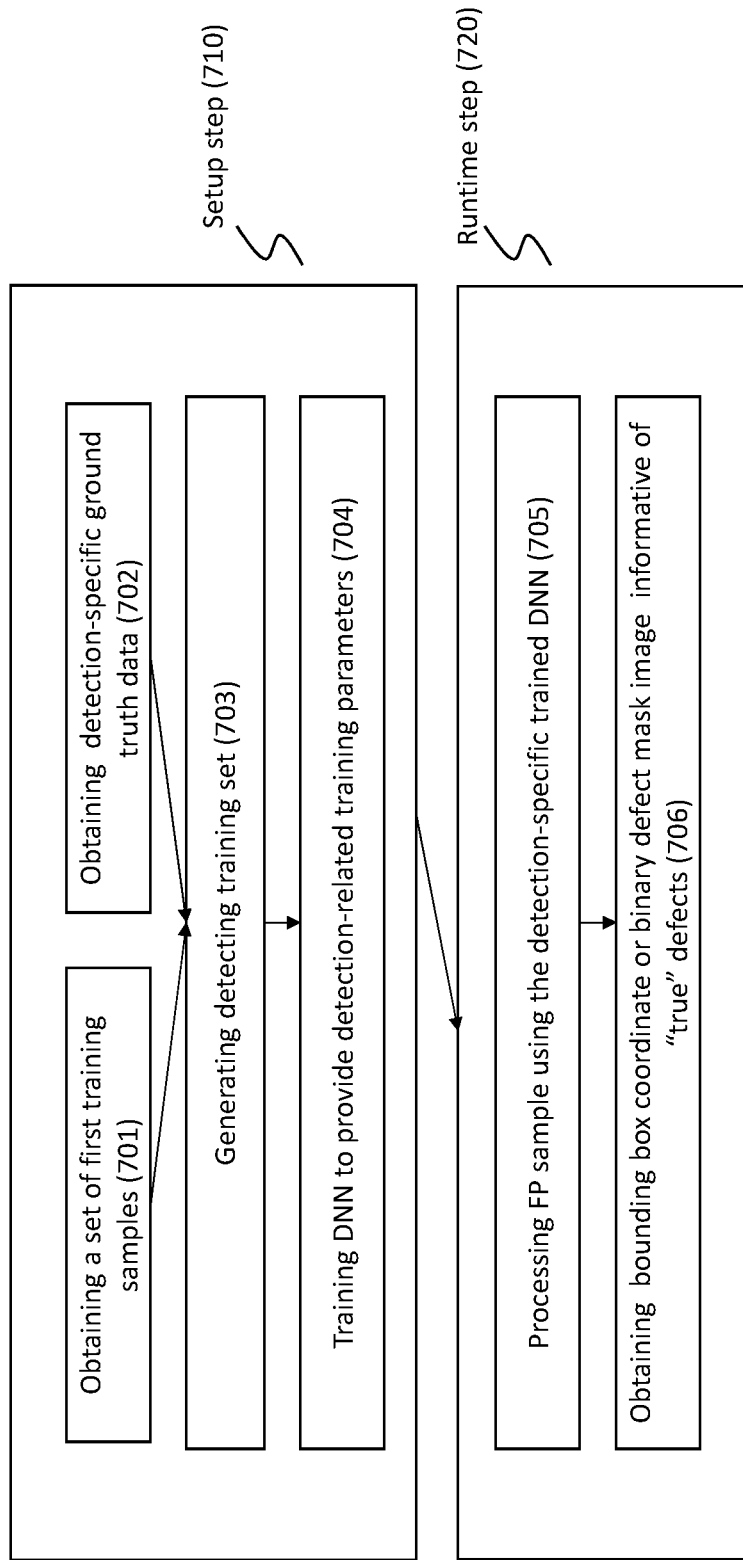
FIG. 7 illustrates a generalized flow-chart of defect detection in accordance with certain embodiments of the presently disclosed subject matter.

Referring to FIG. 7, there is illustrated a non-limiting example of implementing the technique detailed with reference to FIGS. 1-4 for obtaining information related to defect detection, for example filtering potential defects in the image as defects or non-defects, and/or providing position, size, bounding box, borders and/or mask, etc. of the identified defects.

The process comprises a setup step 710 of detection-specific training of DNN and runtime step 720 of using the trained DNN for obtaining information related to defect detection.

During the setup 710, upon obtaining the set of first training samples (701) and ground truth data (702), PMB 104 generates (703) detection training set and uses the generated detection training set to obtain (704) the trained DNN characterized by detection-related training parameters. Generating the detection training set can include augmenting the first training samples and obtaining augmented ground truth data.

The training samples can include a single image informative of suspected locations (e.g. area images with ROI images centered on defect candidates, low resolution area images, etc.) or a group of images (e.g. the image informative of suspected locations in combination with a reference image, images of the same area of interest obtained in different perspectives, etc.).

The ground truth values for each training sample of the training set can include a list of candidate defects, a truth value (e.g. defect/not-defect, true/false) for each of the candidate defects; localization for each true defect (e.g. defect bounding box or mask), etc. Upon generating (703) the detection training set, PMB trains (704) the DNN to provide required detection-related information with minimal error. The training process yields the trained DNN with detection-related training parameters.

During runtime 720, PMB uses the trained DNN to process (705) a FP sample comprising a captured FP image (and, optionally, additional FP images in correspondence with training samples) to obtain data informative of true defects (e.g. determine true defects (if any), mark the true defects (e.g. by bounding boxes or by providing a binary image in which only pixels belonging to the defect get a "1" value and non-defected pixels get a "0" value), obtain shape-related information, etc.).

Figure 8:
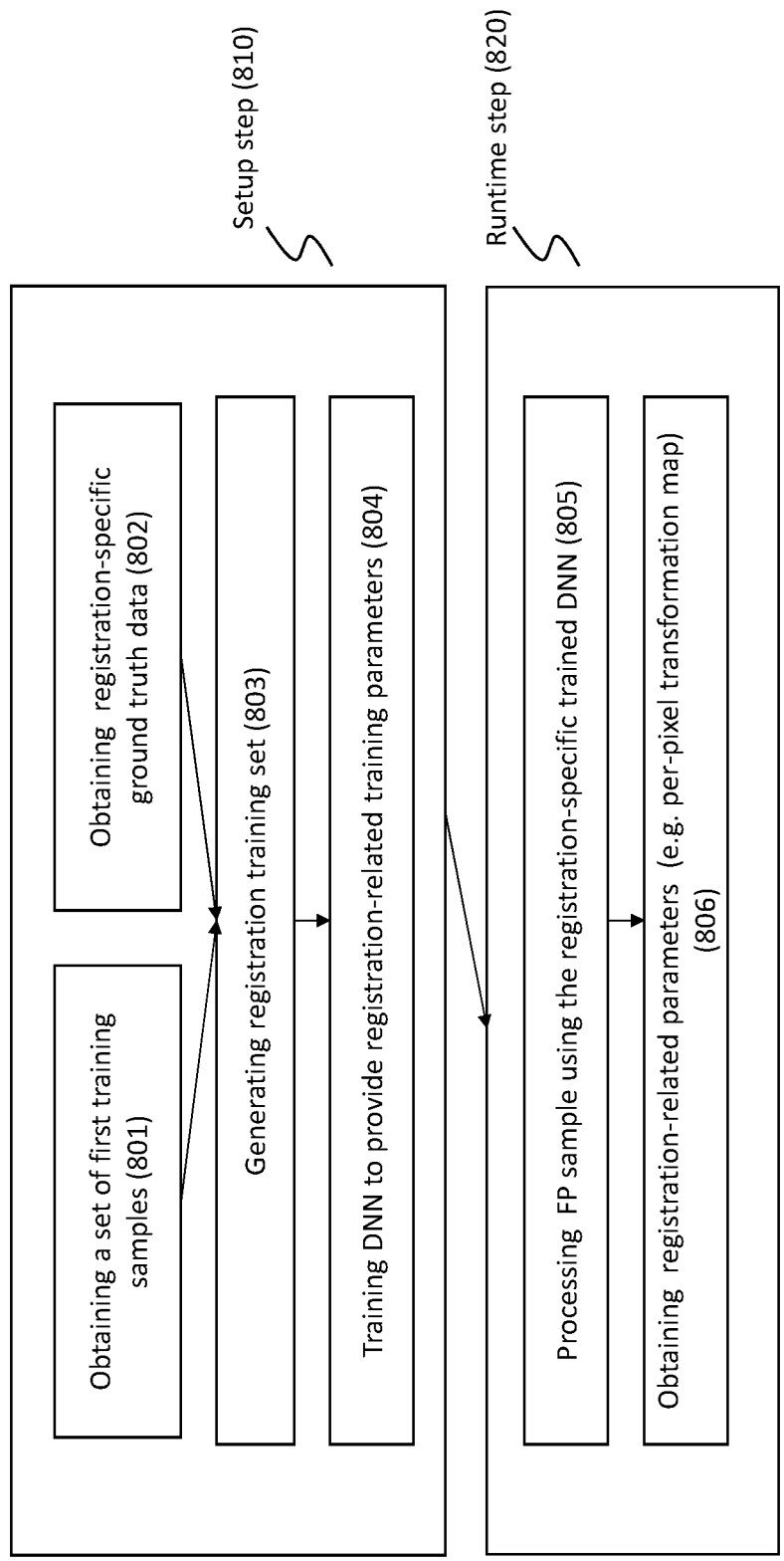
FIG. 8 illustrates a generalized flow-chart of registration examination-related images in accordance with certain embodiments of the presently disclosed subject matter.

Referring to FIG. 8, there is illustrated a non-limiting example of implementing the technique detailed with reference to FIGS. 1-4 for registration between images received from the same or from different examination modalities.

The process comprises a setup step 810 of registration-specific training of DNN and runtime step 820 of using the trained DNN for obtaining information related to registration.

During the setup 810, upon obtaining the set of first training samples (801) and ground truth data (802), PMB 104 generates (803) registration training set and uses the generated registration training set to obtain (804) the trained DNN characterized by registration-related training parameters.

The training set includes training samples each comprising at least a pair of images, wherein one image in each pair is registerable with regard to another image in the pair. The images in a given training sample can be from the same or from different examination modalities.

The ground truth data for each given training sample can include registration-related data with regard to the given training sample (e.g. parametric model representation and parameters thereof (e.g. affine, rotations, translations, reflections, and their combinations, etc.). Optionally, ground truth data can also include per-pixel transformation map (e.g. per-pixel shifts to be provided locally). Alternatively, during training, per-pixel transformation map can be generated by pre-DNN module based on available ground truth data.

Generating a registration training set can include augmenting the first training samples and obtaining augmented ground truth data with regard to the augmented training samples.

Upon generating (803) the registration training set, PMB trains (804) the DNN to provide required registration-related information with minimal error. The training process yields the trained DNN with registration-related training parameters.

During runtime 820, PMB uses the trained DNN to process (805) a FP sample comprising a pair of FP image (and, optionally, additional FP images in correspondence with training samples) to be registered one to another and obtains registration-related parameters of the pair (e.g. per-pixel transformation map and/or other transformation model parameters). The registered images can be later compared (e.g. die-to-die, cell-to-cell, die-to-CAD) for detecting discrepancies indicative of potential defects, improving defect localization in CAD coordinates, etc.

Figure 9:
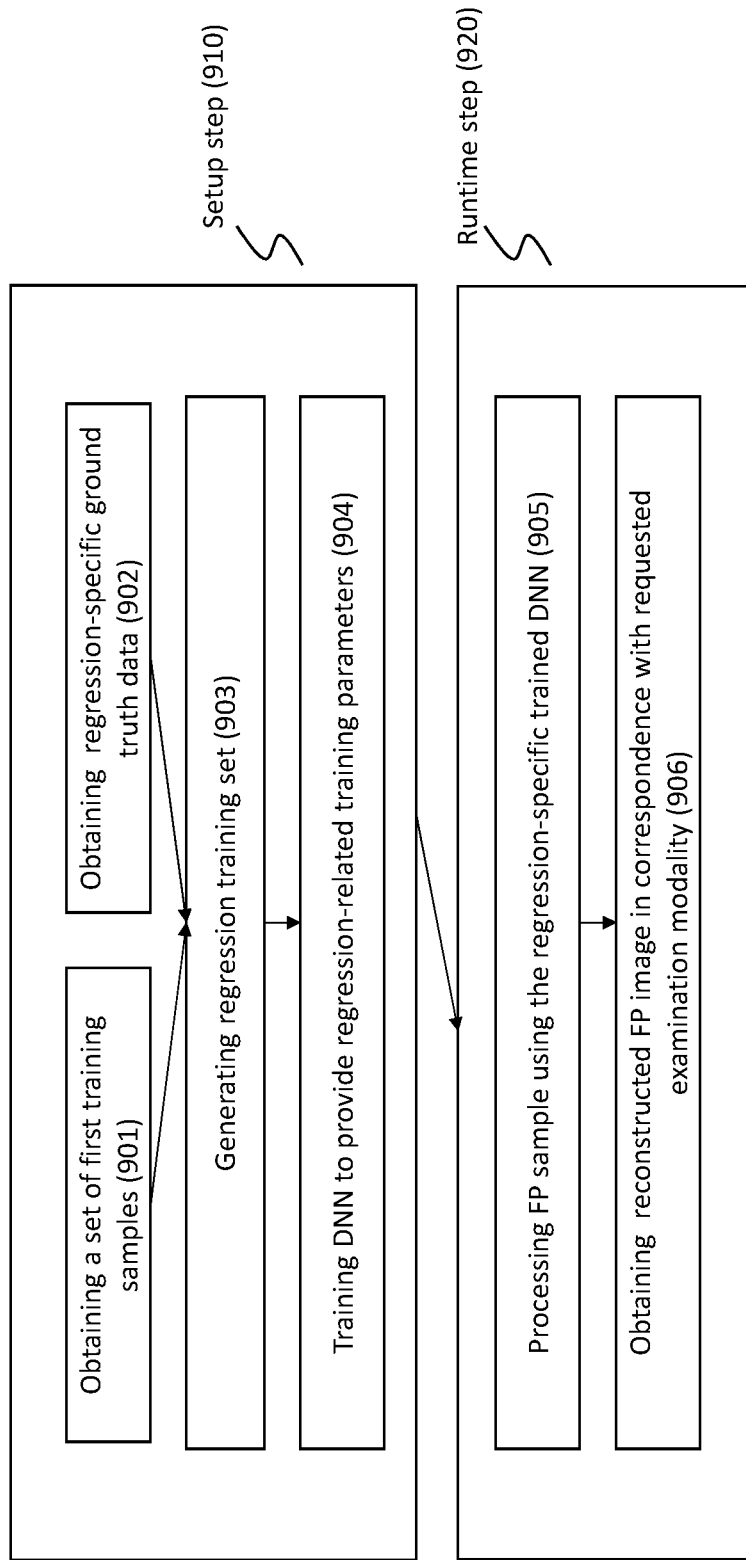
FIG. 9 illustrates a generalized flow-chart of cross-modality regression in accordance with certain embodiments of the presently disclosed subject matter.

Referring to FIG. 9, there is illustrated a non-limiting example of implementing the technique detailed with reference to FIGS. 1-4 for regression application enabling reconstructing an image of specimen (or part thereof) from one or more specimen images from different examination modality(s). By way of non-limiting example, such applications include simulating SEM images from CAD data, simulating SEM image from optical data, etc.

The process comprises a setup step 910 of regression-specific training of DNN and runtime step 920 of using the trained DNN for obtaining regression-related information.

During the setup 910, upon obtaining the set of first training samples (901) and ground truth data (902), PMB 104 generates (903) a regression-specific training set and uses the generated regression-specific training set to obtain (904) the trained DNN characterized by regression-specific training parameters.

The regression-specific training set includes first training samples, each comprising one or more images previously obtained by a first examination modality or modalities. For each given first training sample, ground truth data include one or more images of the corresponding specimen (or part thereof) obtained by another examination modality and associated with the given first training sample. It is noted that the ground truth images obtained by the second examination modality can be images actually captured by the second examination modality or reconstructed image corresponding to the respective images in the first training samples.

Generating regression-specific training set can include augmenting the first training samples and obtaining augmented ground truth data by corresponding augmenting ground truth images associated with the first training samples.

Upon generating (903) the regression-specific training set, PMB trains (904) the DNN to provide required regression-specific information with minimal error. The training process yields the trained DNN with regression-specific training parameters.

During runtime 920, PMB uses the trained DNN to process (905) a FP sample comprising a FP image (and, optionally, additional FP images in correspondence with training samples) from one examination modality so to obtain data usable for reconstructing the FP image in correspondence with another examination modality. The reconstructed image can be further compared to the corresponding image of the second examination modality (e.g. for detecting discrepancies indicative of potential defects, registration, changes optical modes, etc.).

It is noted that setup steps illustrated with reference to FIGS. 5-9 can be cyclic, and respective training can be repeated several times (optionally, with an updated training set) until the DNN is sufficiently trained.

It is noted that an examination flow can include two or more applications illustrated with reference to FIGS. 5-9, each application with its own application-specific trained DNN. The obtained application-specific defect-related information can be further fed into a bigger system (e.g. ADC classifiers or ADR detector).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of segmentation of a fabrication process (FP) image obtained in a fabrication of a semiconductor specimen, the method comprising:
upon obtaining, by a computer, a Deep Neural Network (DNN) trained to provide segmentation-related data, using the obtained trained DNN to process a fabrication process (FP) sample, wherein the DNN is trained using a segmentation training set comprising a plurality of first training samples and ground truth data associated therewith, each first training sample comprises a training image, and the segmentation-related data is selected from a group comprising a grayscale image in which different color values for each pixel correspond to different segments in the training image, a representation of edges of each segment, and a representation of vertices of each segment, and wherein the FP sample comprises the FP image, wherein the segmentation training set further comprises a plurality of augmented training samples, wherein at least a part of the augmented training samples is obtained by tone mapping; and
resulting from the processing, obtaining, by the computer, segments-related data characterizing the FP image, wherein the obtained segments-related data are usable for automated examination of the semiconductor specimen.

2. The method of claim 1, wherein the obtained segments-related data are informative of at least one of per-pixel values, per-pixel labels, CAD polygons, CAD models, regions of interest in the FP image, background of the FP image and foreground of the FP image.

3. The method of claim 1, wherein the FP image is selected from the group consisting of images resulting from different examination modalities and a design data-based image of the semiconductor specimen.

4. The method of claim 1, wherein the obtained segments-related data are usable for automatic defect classification (ADC) to define a location of a defect with regard to a background.

5. The method of claim 1, wherein the obtained segments-related data are usable for automatic defect review (ADR) to apply segment-specific detection thresholds.

6. The method of claim 1, wherein the obtained segments-related data are usable for detecting locations of potential defects.

7. The method of claim 1, wherein the obtained segments-related data are usable by another examination-related application using another DNN trained using a training set comprising ground truth data specific for the another examination-related application.

8. The method of claim 1, wherein each of the first training samples comprises at least one training image obtained by an examination modality that is not available when obtaining the FP sample.

9. The method of claim 1, wherein at least a part of the segmented training samples is obtained by augmenting at least part of the first training samples and augmented ground truth data associated with the augmented training samples.

10. The method of claim 9, wherein at least a part of the augmented training samples is obtained by one or more augmentation techniques from the group consisting of adding noise, blurring, and generating synthetic images.

11. A non-transitory computer readable medium comprising instructions that, when executed by a computer, cause the computer to perform a method of segmentation of a fabrication process (FP) image in a fabrication of a semiconductor specimen, the method comprising:
upon obtaining, by a computer, a Deep Neural Network (DNN) trained to provide segmentation-related data, using the obtained trained DNN to process a fabrication process (FP) sample, wherein the DNN is trained using a segmentation training set comprising a plurality of first training samples and ground truth data associated therewith, each first training sample comprises a training image, and the segmentation-related data is selected from a group comprising a grayscale image in which different color values for each pixel represent different segments in the training image, a representation of edges of each segment, and a representation of vertices of each segment, and wherein the FP sample comprises the FP image, wherein the segmentation training set further comprises a plurality of augmented training samples, wherein at least a part of the augmented training samples is obtained by tone mapping; and
resulting from the processing, obtaining, by the computer, segments-related data characterizing the FP image, wherein the obtained segments-related data are usable for automated examination of the semiconductor specimen.

12. The non-transitory computer readable medium of claim 11, wherein the obtained segments-related data are informative of at least one of per-pixel segmentation, per-pixel labels, CAD polygons, CAD models, regions of interest in the FP image, background and foreground of the FP image.

13. The non-transitory computer readable medium of claim 11, wherein the FP image is selected from the group consisting of images resulting from different examination modalities and a design data-based image of the semiconductor specimen.

14. The non-transitory computer readable medium of claim 11, wherein at least a part of the segmentation training set is obtained by augmenting at least part of the first training samples and augmented ground truth data associated with the augmented training samples and informative of segments-related data associated with the augmented training samples.

15. The non-transitory computer readable medium of claim 14, wherein at least a part of the augmented training samples is obtained by one or more augmentation techniques from the group consisting of adding noise, blurring, and generating synthetic images.

16. A system usable for examination of a semiconductor specimen, the system comprising a processing and memory block (PMB) operatively connected to an input interface and an output interface, wherein:
   the input interface is configured to receive one or more fabrication process (FP) samples each comprising a FP image to be segmented; the PMB is configured:
   to obtain a Deep Neural Network (DNN) trained to provide segmentation-related data and to process a fabrication process (FP) sample using the obtained trained DNN, wherein the DNN is trained using a segmentation training set comprising a plurality of first training samples and ground truth data associated therewith, each first training sample comprises a training image, and the segmentation data is selected from a group comprising a grayscale image in which different color values for each pixel represent different segments in the training image, a representation of edges of each segment and a representation of vertices of each segment and wherein the FP sample comprises the FP image to be segmented, wherein the segmentation training set further comprises a plurality of augmented training samples, wherein at least a part of the augmented training samples is obtained by tone mapping; and
   resulting from the processing, to obtain segments-related data characterizing the FP image, wherein the obtained segments-related data are usable for automated examination of the semiconductor specimen, and the output interface is configured to output the obtained segments-related data.

17. The system of claim 16, wherein at least a part of the segmentation training set is obtained by augmenting at least part of the first training samples and augmented ground truth data associated with the augmented training samples and informative of segments-related data associated with the augmented training samples.

18. The system of claim 17, wherein at least a part of the augmented training samples is obtained by one or more augmentation techniques from the group consisting of adding noise, blurring, and generating synthetic images.

* * * * *